Figure 1:
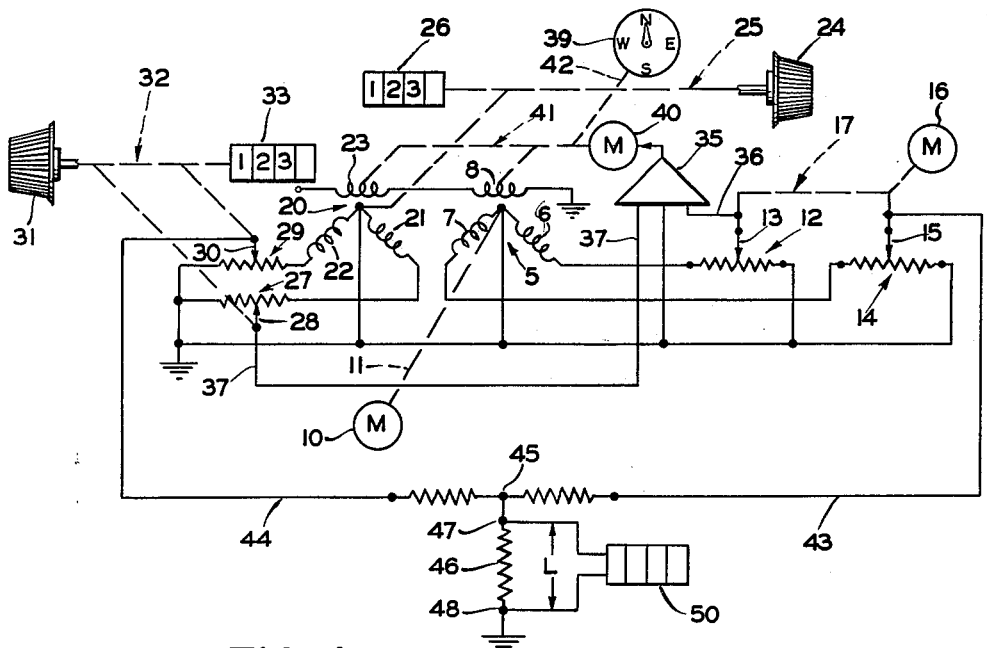

May 21, 1963     M. BROWN     3,090,958

COURSE LINE COMPUTER

Filed Dec. 9, 1959

INVENTOR.
MILTON BROWN
BY Charles J. Worth
AGENT

United States Patent Office 3,090,958
Patented May 21, 1963

3,090,958
COURSE LINE COMPUTER
Milton Brown, Glen Rock, N.J., assignor to The Bendix Corporation, a corporation of Delaware
Filed Dec. 9, 1959, Ser. No. 858,440
10 Claims. (Cl. 343—112)

This invention relates to navigation equipment for vehicles and more specifically to a computer device for aircraft capable of continuously providing bearing and range information to an automatic control and/or to various pilotage indicators.

With instrumentation available aircraft now fly courses from a point of departure to a final destination with bearing and distance information continuously available from range station to range station located along the course of the flight. Traffic control, with present day equipment, for a route bearing heavy traffic provides altitude lanes for flight and must allow lead time between the aircraft in the various altitude lanes. These air lanes extend between ground installations which are limited in number to prevent multistation reception at the same frequency. Equipment capable of permitting flight along a controlled path having a track parallel to radio range course (prescribed air lane) has been considered, however, the equipment has limited versatility. Even with radar tracking installations, it is necessary for a pilot to have the precise geographical location of his aircraft available because this equipment, too, which is not automatic and requires voice control, has limited function and installation frequency. The largest amount of available air space are lateral extensions of the air lanes, which are not in use primarily due to the lack of adequate equipment capable of continuously providing range and bearing information to an aircraft flying a course which is in the lateral extensions of such prescribed courses.

Accordingly, it is an object of this invention to provide equipment capable of solving and continuously presenting the bearing and the range of a course to be tracked which is not limited to a station-to-station course and extends across radials from a single radio range station reference.

Another object of this invention is to combine a computer with airborne equipment which receives range and bearing information between the aircraft and a range station for continuously solving and presenting the range and bearing of a course to a destination which is not limited to being a predetermined radial from the radio range station being used.

And, another object of this invention is to provide additional air lanes between radio range stations by use of a computer which continuously presents bearing information to and from a desired location.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

Figure 2:
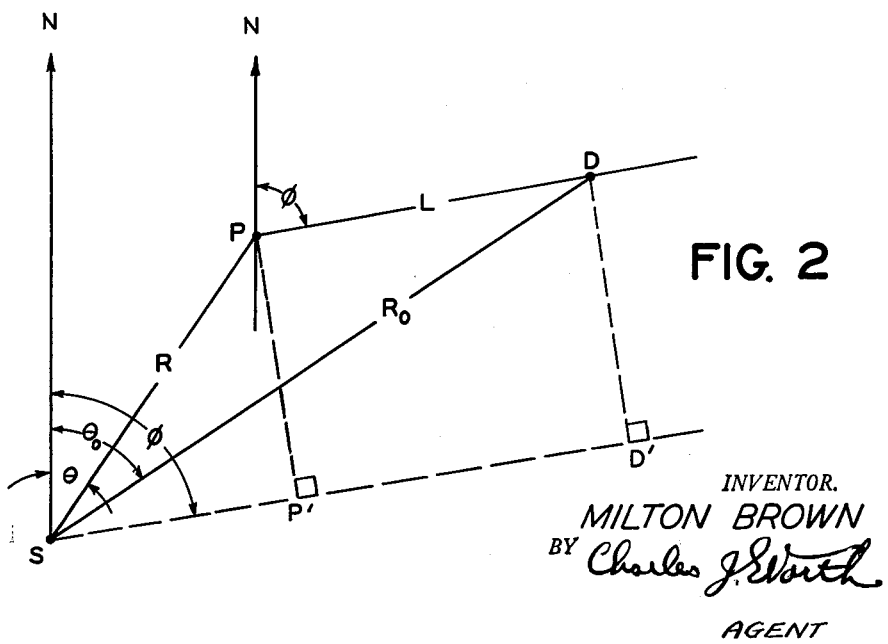

FIGURE 1 is a diagrammatic illustration of a computer made in accordance with the subject invention, and, FIGURE 2 is a vector diagram pictorially illustrating the solution of a typical course by the computer of FIGURE 1.

In this description and the appended claims, "radio range station," "signal transmitter" and "ground installation" are considered to mean VOR, DME, Tacan, Vortac or any means of providing aircraft with bearing and/or range signals from a fixed location. Referring now to the drawing, specifically to FIGURE 2 which vectorially illustrates the solution accomplished by the novel computer, the position P indicates the location of the aircraft which is at a range R from a known radio station S at a bearing $\theta$. The bearing $\theta$ and range R are continuously available to the pilot by airborne radio equipment in the aircraft in cooperation with the ground station. The aircraft at the location P has a destination D which is of an unknown "position to destination" range L and an unknown "position to destination" bearing $\phi$. Nowhere along this track PD is there a range station and therefore the station S is used, being completely remote from the total course to be traversed but within reception range of the aircraft. When the aircraft is at the location P, the present heading, point of departure and course that has been traversed to reach the location P are of no value to the computer as this information is not required for obtaining the range L and bearing $\phi$ of the new course to be flown. From information available or by measurements on a map, the range $R_0$ and bearing $\theta_0$ of the destination D from the station S is determined.

To illustrate the trigonometric solution for the bearing $\theta$ and the range L, the aircraft location P is determined by extending a vector along the angle $\theta$ from the location of the station S which has a length R. Similarly the destination derived by extending a vector along the angle $\theta_0$ from the station location S which has a length $R_0$. By running a line from the aircraft location P to the destination D, a vector indication of the desired course PD having a bearing $\phi$ and a range L is obtained. Parallel lines are now extended through the aircraft location P and the destination D perpendicular to the course PD. A line parallel to the course PD is then drawn through the station S which intersects the parallel lines drawn through the locations P and D at P' and D', respectively. It can now be seen that the triangles SPP' and SDD' have been constructed so the corresponding sides PP' and DD' are equal. At this point, it is important to realize that these triangles are constructed with the sides DD' and PP' perpendicular to the desired course PD and without respect to their orientation to North. The distance R and $R_0$ are known, each being the hypotenuse of the respective triangles.

To solve for the desired "position to destination" bearing, we know:

(1) $PP' = R \sin(\phi - \theta)$, and $DD' = R_0 \sin(\phi - \theta_0)$ since (2) $PP' = DD'$, $R \sin(\phi - \theta) = R_0 \sin(\phi - \theta_0)$ or (3) $R \sin(\phi - \theta) - R_0 \sin(\phi - \theta_0) = 0$ To solve for the unknown "position to destination" range L, we know:

(4) $SD' = R_0 \cos(\phi - \theta_0)$, and $SP' = R \cos(\phi - \theta)$ since (5) $SD' - SP' = P'D'$ or L then (6) $R_0 \cos(\phi - \theta_0) - R \cos(\phi - \theta) = L$ With the prerequisite information put into the computer, it can solve for the one unknown, the angle $\phi$, in the Equation 3 and simultaneously obtain the value of L in the Equation 6.

This will be understood by now referring to FIGURE 1 of the drawing which is a diagrammatic illustration of the computer having two resolvers 5 and 20 with their respective primary coils 8 and 23 which may be excited in series or parallel. The stator of the resolver 5 has a sine winding 6 and a cosine winding 7 in quadrature, which are electrically connected in series with the resistor windings of potentiometers 12 and 14, respectively. The stator is coupled by linkage 11 to a motor 10 which is energized by the airborne signal receiver equipment (not shown). The motor 10 rotates the stator to the angle $\theta$, from a reference North, wherein the winding 6 will have a voltage output representative of "Sin $\theta$" and the winding 7 will have a voltage output of representative of "Cos $\theta$." The distance R input is accomplished by positioning the wipers 13 and 15 on the windings of the potentiometers 12 and 14, respectively, by a motor 16. The motor 16 is energized by the DME portion of the signal receiver equipment and is connected to the wipers 13 and 15 by linkage 17. The stator of the resolver 20 has a sine winding 21 and a cosine winding 22 in quadrature, which are electrically connected in series to the windings of the potentiometers 27 and 29, respectively. The stator is manually rotated to the angle $\theta_0$ as indicated at 26 by a control 24 and the connecting linkage 25 wherein the winding 21 has a voltage output representative of "Sin $\theta_0$" and the winding 22 has a voltage output representative of "Cos $\theta_0$." The distance $R_0$ input is accomplished by positioning the wipers 28 and 30 of the potentiometers 27 and 29, respectively, by a control 31 through linkage 32. The distance $R_0$ is indicated at 33. A voltage representative of "R sin $\theta$" is connected to an amplifier 35 from the potentiometer wiper 13 through a wire 36 while the voltage representative of "$R_0$ sin $\theta_0$" is connected to the amplifier 35 from the wiper 28 through the wire 37. The amplified difference between the two voltage inputs which are connected to the servomotor 40 causes it to rotate and position the rotors 8 and 23 until the resulting voltage emission from the potentiometers 12 and 27 which are supplied from the sine windings 6 and 21 are equal to each other and therefore are representative of "R sin $(\phi-\theta)$" and "$R_0$ sin $(\phi-\theta_0)$," respectively. Thus the rotation of the motor 40, the two rotors 8 and 23 and the connection 41 is representative of the angle $\phi$ and is transmitted to bearing indicating equipment 39 through the connection 42.

To obtain the range L when the computer servomotor 40 has reached the null position R sin $(\phi-\theta)-R_0$ (sin $\phi-\theta_0)=0$, the windings 7 and 22 will have voltage outputs representative of "Cos $(\phi-\theta)$" and "Cos $(\phi-\theta_0)$," respectively. These voltages are transmitted through the potentiometers 14 and 29, respectively. The voltage outputs from the potentiometers 14 and 29 are representative of "R cos $(\phi-\theta)$" and "$R_0$ cos $(\phi-\theta_0)$," respectively, and are connected to the junction 45 through the wires 43 and 44. The resulting voltage at the junction 45 being representative of "$R_0$ cos $(\phi-\theta_0)-R$ cos $(\phi-\theta)$" is connected to ground across a resistor 46. To obtain a signal indicative of the range L, instrumentation 50 is connected to the terminals 47 and 48 in parallel with the resistor 46.

The motors 10 and 16 may be replaced by manual controls similar to 24 and 31 in equipment which is to be used to solve vector problems or to provide bearing and distance information for a given location of the aircraft without departing from the scope of this invention.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A device responsive to bearing and range signals from a transmitter for solving the bearing of a course to a destination, comprising first means responsive to such signals and having an output voltage representing the product of the range and the sine of the bearing of said device from the transmitter, second means having an output voltage representing the product of the range and the sine of the bearing of the destination from the transmitter, and third means responsive to the output voltages of said first two means to vary such voltages so that the response of said third means is representative of the bearing to the destination when the two voltages are equal to one another.

2. The device claimed in claim 1, in which said first two means each includes a resolver having an output voltage representing the sine of the associated bearing, and a variable resistor to receive such voltage and having an output voltage representing the product of the voltage from the resolver and the associated range.

3. The device claimed in claim 1, in which fourth means is operatively connected to said first means and has an output voltage representing the product of the range and the cosine of the bearing of said device from the transmitter, fifth means is operatively connected to said second means and has an output voltage representing the product of the range and the cosine of the bearing of the destination from the transmitter, and said third means varying the output voltages of said last two means in unison with said first two means such that the difference between the output voltages of said last two means represents the range to the destination when the response of said third means represents the bearing to the destination.

4. The device claimed in claim 3, in which each of said first two means include a resolver having an output voltage representing the sine of the associated bearing, each of said last two means include a resolver having an output voltage representing the cosine of the associated bearing, and each of said first two means and said last two means including a variable resistor to receive the voltage from each of said resolvers and having an output voltage representing the product of the voltage from such resolver and the associated range.

5. A device using a fixed reference for solving the bearing of a course to a destination, comprising first means having an output voltage representing the product of the range and the sine of the bearing of such device relative to the reference, second means having an output voltage representing the product of the range and the sine of the bearing of the destination relative to the reference, and third means responsive to the output voltages of said first two means to provide information representative of the bearing to the destination.

6. The device claimed in claim 5, in which fourth means is operatively connected to said first means and has an output representing the product of the range and the cosine of the bearing of the device relative to the reference, fifth means is operatively connected to said second means and has an output voltage representing the product of the range and the cosine of the bearing of the destination relative to the reference, and said third means varying the output voltages in unison with said first two means such that the difference between the output voltages of said last two means represents the range to the destination and said third means provides information representative of the bearing to the destination.

7. A computer for solving the unknown angle of a vector which connects the termini of two vectors with a common terminus, comprising two resolvers each adjustable to the angle of one of the known vectors and having a sine winding, a variable resistor electrically connected in series with each of said windings to produce a voltage representing the product of the length and the sine of the angle of one of such two vectors, a servomotor connected to said two resolvers and being responsive to said two voltages, said servomotor adapted to adjust said two resolvers in unison for varying said voltages such that when such voltages are equal to one another the movement of said servomotor is representative of the unknown angle.

8. A computer for solving an unknown vector which connects the termini of two known vectors with a common terminus, comprising two resolvers each including a sine and a cosine winding and each being adjustable to the angle of one of said two known vectors, a variable resistor electrically connected in series with each of said sine windings to produce a voltage representing the product of the length and the sine of the angle of such vector, a servomotor connected to said resolvers and responsive to the difference of said voltages to adjust said resolvers in unison such that the response of said servomotor is representative of the unknown angle when said voltages are equal to one another, a variable resistor electrically connected in series with each of said cosine windings to produce voltages representing the products of the lengths and the cosine of the angles of said vectors, and said voltages connected to each other such that the difference therebetween is representative of the length of the unknown vector.

9. A device for solving the bearing of a course to a destination and being responsive to signals from a transmitter, comprising a first and second resolver, said first resolver having a rotor and a stator moveable relative to one another to the bearing of the device from the transmitter in response to signals from such transmitter, a variable resistor electrically connected in series to said resolver and being responsive to range signals from the transmitter to produce a voltage representing the product of the range and the sine of the bearing angle of the device from the transmitter, said second resolver having a rotor and a stator positionable relative to one another to the bearing of the destination from the transmitter, a variable resistor electrically connected in series to said sine winding of said second resolver to produce a voltage representing the product of the range and the sine of the bearing of the destination from the transmitter, a servomotor connected to said two resolvers for moving in unison said rotors and said stators relative to one another in response to said voltages such that the response of said servomotor is representative of the bearing to the destination when such voltages are equal to one another.

10. A device for solving a course vector to a destination and being responsive to signals from a transmitter, comprising a first resolver including a sine winding and a cosine winding, said resolver having a rotor and a stator moveable relative to one another to the bearing of the device from the transmitter in response to signals from such transmitter, a variable resistor electrically connected in series to each of said windings and being coupled to one another, said variable resistors responsive to range signals from the transmitter, a second resolver including a sine winding and a cosine winding, said second resolver having a rotor and a stator positionable relative to one another to the bearing of the destination from the transmitter, a variable resistor electrically connected in series to each of said windings of said second resolver and being coupled to one another to be positioned together proportionate to the range of the destination from the transmitter, said two sine windings and said serially connected resistors producing first voltages representing the product of the sine of the bearing angles and the associated ranges, a servomotor coupled to said first and second resolvers to move the two rotors and two stators relative to one another in unison in response to the said voltages, such response of said servomotor being representative of the bearing to the destination when said voltages are equal to one another, and said two cosine windings and said serially connected resistors producing second voltages representing the product of the cosine of the bearing angles and the associated ranges such that the difference between such second voltages is representative of the range to the destination when said first voltages are equal to one another.

References Cited in the file of this patent
UNITED STATES PATENTS

| | | |
|---|---|---|
| 2,419,970 | Roe et al. | May 6, 1947 |
| 2,599,889 | Biggs et al. | June 10, 1952 |
| 2,848,160 | Biderman | Aug. 19, 1958 |